Patented Mar. 30, 1954

2,673,803

UNITED STATES PATENT OFFICE 2,673,803

MILK SUBSTITUTE (MINERAL-ENRICHED MEAT)

Haines B. Lockhart, Chicago, Ill., assignor to Swift & Company, Chicago, Ill., a corporation of Illinois No Drawing. Application January 28, 1952, Serial No. 268,691

2 Claims. (Cl. 99—53)

The present invention relates in general to a mineral-enriched meat product and more particularly to a mineral-enriched meat product which is so formulated as to simulate cow's milk in the calcium, phosphorus, magnesium, potassium, sodium, and fat content and to simulate human milk in the protein and carbohydrate content.

Milk is an important item in a child's diet because of the nutrients it supplies. Unfortunately, many children are unable to drink cow's milk as they are allergic to the milk proteins found therein. These allergies manifest themselves in children in the form of colic, diarrhea, nutritional edema, and dermatitis. Many children also tend to reject cow's milk after infancy and thus do not obtain an adequate amount of calcium. There has also been a serious shortage of cow's milk in many parts of the world in recent years.

Likewise, human milk also presents problems of a serious nature. Although cases of infant sensitivity to human milk are very rare, human milk is not always readily available, and when it must be purchased, is usually very expensive. Human milk is also often produced by mothers who are not on a proper diet which results in the milk usually being deficient in one or more of the minerals, vitamins, etc., which are essential for the child's proper development.

Various substitutes for cow's milk and for human milk made from vegetable products, viz., soybean milk and rice milk, have been utilized in the past. In general these substitutes have not been satisfactory as the allergy problem has not been obviated, the expense of these substitutes has been great, and the supply has been limited.

It is, therefore, an object of the present invention to provide a milk substitute which overcomes these prior art difficulties.

An additional object of the invention is to provide a mineral-enriched meat product designed for feeding children who are allergic to cow's milk.

A further object of the invention is to provide a mineral-enriched meat product which contains substantially the same amounts of calcium, phosphorus, magnesium, potassium, sodium, and fat as does cow's milk.

Another object is to provide a mineral-enriched meat product which is formulated to simulate human milk in protein and carbohydrate content.

Still a further object of the invention is to provide a mineral-enriched meat product that is formulated to provide adequate amounts of iron, vitamin A, vitamin D, vitamin B₁, vitamin B₂, vitamin C, and niacin for the diet of a normal infant.

Other objects and advantages of the invention will be apparent as the invention is hereinafter described in more detail.

It has now been found that by mixing together in proper proportions finely-comminuted meat, edible fat, nontoxic mineral salts, carbohydrates, salt, vitamins, and water, a product is obtained which resembles in important respects the composition of cow's and human milk.

More specifically, my product preferably embodies a mixture, in a predetermined and proper proportion, of finely-comminuted beef, lard, tapioca flour, calcium phosphate, magnesium acetate, potassium chloride, sucrose, lactose, sodium chloride, water, ferrous sulphate, vitamin A, vitamin D, ascorbic acid, thiamine, riboflavin, and niacinamide, in a permanent and stable form, said admixture being accomplished by mechanical manipulation. The sucrose and lactose may either be incorporated into the original mixture or be added later by the consumer. However, it is preferred to incorporate these sugars into the original mixture as any inconvenience that the consumer might experience in so doing is obviously eliminated. Vitamins may be added by the consumer in the amounts illustrated in Example I or may be varied slightly as to the particular vitamin and the amount to be utilized so as to satisfy the consumer's own particular requirements.

In the process of formulating my milk substitute the first step is to precook the meat in boiling water until it becomes tender. The precooked meat is then comminuted and the mineral salts, carbohydrates, fat, and vitamins are mixed in with the comminuted meat. The resulting mixture is filled into tins and retorted at a temperature and for a time sufficient to give a sterile cook, for example, retorted at 235° F. for a period of 90 minutes.

The ingredients are mixed for a period of time sufficient to insure thorough mixing of the ingredients. Any conventional mixer known to the art may be employed in mixing the ingredients.

My product possesses excellent nutritive properties which make it ideal for young growing children. The mineral content of the product offers the child the nutrients needed for normal bone growth, a strong skeletal structure, and sound healthy teeth. The product is thoroughly digestible and possesses an appetizing and agreeable flavor and aroma which also makes it very desirable for children and adults suffering from loss of appetite.

The product also possesses excellent keeping qualities and may be kept by the consumer in its container for indefinite periods of time without danger of spoilage. Refrigeration is not required if the product is kept within its sealed container. However, if the container has been opened, it is necessary that the product be maintained under refrigerated conditions.

The following specific examples are provided to illustrate the composition of the present invention but are not to be construed as limitations thereon.

Example I represents the formulation that is preferred in manufacturing my milk substitute. Example II is an alternative formulation that could also be utilized.

Example I

| | Per cent |
|---|---|
| Finely-comminuted beef (amount to supply following quantity of protein) | 6.00 |
| Lard | 11.40 |
| Tapioca flour | 5.85 |
| $Ca_3(PO_4)_2$ | 1.16 |
| $Mg(C_2H_3O_2)_2 \cdot 4H_2O$ | .28 |
| KCl | 0.60 |
| NaCl | 0.29 |
| Sucrose | 8.70 |
| Lactose | 1.35 |
| $H_2O$ | 64.37 |
| | 100.00 |

The following ingredients are added to 100 pounds of the above formulation:

| | | |
|---|---|---|
| $FeSO_4 \cdot 7H_2O$ | grams | 6 |
| Vitamin A | I. U. | 440,000 |
| Vitamin D | I. U. | 131,000 |
| Ascorbic acid | grams | 5.09 |
| Thiamine | do | 0.22 |
| Riboflavin | do | 0.12 |
| Niacinamide | do | 0.29 |

It is to be noted that the above formulation is a concentrate. Before it is fed to the child, it will be diluted with 2 volumes of water.

Example II

| | Per cent |
|---|---|
| Finely-comminuted beef (amount to supply following quantity of protein) | 7.00 |
| Lard | 7.6 |
| Tapioca flour | 4.1 |
| $Ca_3(PO_4)_2$ | 0.64 |
| $Mg(C_2H_3O_2)_2 \cdot 4H_2O$ | 0.16 |
| $H_2O$ | 74.26 |
| KCl | 0.39 |
| NaCl | 0.15 |
| Sucrose | 3.8 |
| Lactose | 1.9 |
| | 100.00 |

Unlike the usual and customary action of ingredients commonly utilized in food preparation, the ingredients which I utilize coact to produce a new result. The desired meat protein, edible fat, starch, water, sugar, salt, vitamins, and nontoxic calcium, magnesium, phosphorus, potassium, and iron salts not only physically combine to produce a very tasty and nutritious food product but also coact to result in a product which contains the essential ingredients present in cow's and human milk. Thus, a product is produced which is of considerable importance and value not only to the consuming public but to the fields of medicine and dietetics as well.

The formula of my new product has a wide range of flexibility. It is not absolutely necessary to use finely-comminuted beef. Any available finely-comminuted animal meat may be utilized as long as enough meat is present to supply at least 6.00 per cent protein to the final product. Occasionally it is desirable to substitute other meat products, such as lamb or pork, for the beef, as some people appear to be allergic to beef proteins, as well as to those of milk. Liver meat is particularly useful for incorporating into my formulation due to its excellent mineral and vitamin content.

A level of about 6 per cent protein should preferably be maintained in my milk substitute as the product requires at least that percentage of protein so that when it is diluted for feeding it will approximate the amount of protein found in human milk. However, higher amounts of protein may be utilized in my product without deleterious effects if desired.

Likewise, any edible fat could be used in place of lard. Vegetable oils, such as olive, cottonseed, and cocoanut oil, are particularly suitable for use in my product.

In Example I, vitamins A and D are stated as being added to the formulation in 440,000 I. U.'s and 121,000 I. U.'s respectively. The abbreviation I. U. denotes international units which is a measure of the vitamin potency of a substance.

Tapioca flour, an ingredient of my improved meat product, is a flour manufactured by grinding the roots of the cassava or Jatropha manihot plant, a plant found primarily in Brazil and the West Indies. This flour consists of approximately 88 per cent starch. Potato flour (84 per cent starch) or other edibles having a high starch content could be used in place of tapioca flour.

Other minerals may be utilized in my product than the minerals listed in the specific examples so long as the final product contains essentially the same amounts of calcium, phosphorus, magnesium, and potassium as naturally occur in cow's milk. For example, calcium gluconate, calcium carbonate, or di-calcium phosphate, may be used instead of calcium phosphate, and potassium phosphate may be utilized in place of potassium chloride. Other nontoxic magnesium compounds, such as magnesium citrate and magnesium chloride, may likewise be employed instead of magnesium acetate, and salts, such as ferric ammonium citrate, may be used in place of ferrous sulphate.

Obviously, many modifications and variations of the invention as hereinbefore set forth may be made without departing from the spirit and scope thereof, and therefore only such limitations should be imposed as are indicated in the appended claims.

I claim:
1. A milk substitute liquid concentrate which comprises: a finely-comminuted meat from the group consisting of beef, lamb, pork, liver, and combinations thereof, said meat being present in sufficient quantity to provide at least about six percent by weight of meat protein as the sole animal protein in said concentrate; an added amount of fat from the group consisting of lard, edible vegetable oils, and combinations thereof; an added amount of carbohydrate from the group consisting of tapioca flour, potato flour, sucrose, lactose, and combinations thereof; and minerals from the group consisting of calcium phosphate, calcium gluconate, calcium carbonate, di-calcium phosphate, magnesium acetate, magnesium citrate, magnesium chloride, ferrous sulphate, ferric ammonium citrate, potassium chloride, potassium phosphate, sodium chloride, and combinations thereof.

2. A milk substitute liquid concentrate which comprises: a finely-comminuted beef present in sufficient quantity to provide at least six percent by weight of meat protein as the sole animal protein in said concentrate; an added amount of fat from the group consisting of lard, edible vegetable oils, and combinations thereof; an added amount of carbohydrate from the group consisting of tapioca flour, potato flour, sucrose, lactose, and combinations thereof; and minerals from the group consisting of calcium phosphate, calcium gluconate, calcium carbonate, di-calcium phosphate, magnesium acetate, magnesium citrate, magnesium chloride, ferrous sulphate, ferric ammonium citrate, potassium chloride, potassium phosphate, sodium chloride, and combinations thereof.

HAINES B. LOCKHART.

References Cited in the file of this patent

UNITED STATES PATENTS

| Number | Name | Date |
|---|---|---|
| 1,216,052 | Beckman et al. | Feb. 13, 1917 |
| 1,302,486 | Dunham | Apr. 29, 1919 |
| 2,078,962 | Miller | May 4, 1937 |